United States Patent
Ge et al.

(10) Patent No.: US 10,592,523 B1
(45) Date of Patent: Mar. 17, 2020

(54) NOTIFICATION SYSTEM AND METHOD

(71) Applicant: EMC IP HOLDING COMPANY LLC, Hopkinton, MA (US)

(72) Inventors: Meiling Ge, Shanghai (CN); Hao Sun, Shanghai (CN); James O. Pendergraft, Raleigh, NC (US); Jichao Zhang, Shanghai (CN); Chun Wei, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 383 days.

(21) Appl. No.: 15/279,716

(22) Filed: Sep. 29, 2016

(51) Int. Cl.
*G06F 16/25* (2019.01)

(52) U.S. Cl.
CPC .................. *G06F 16/252* (2019.01)

(58) Field of Classification Search
None
See application file for complete search history.

(56) References Cited

U.S. PATENT DOCUMENTS

| | | | | |
|---|---|---|---|---|
| 8,209,676 | B2* | 6/2012 | Kapadekar | G06F 8/65 717/171 |
| 8,935,221 | B1* | 1/2015 | Lazier | G06F 17/30303 707/690 |
| 2013/0124500 | A1* | 5/2013 | Beavin | G06F 17/30448 707/714 |
| 2013/0339385 | A1* | 12/2013 | Abrams | G06F 17/30566 707/770 |
| 2015/0007199 | A1* | 1/2015 | Valeva | G06F 9/546 719/313 |
| 2015/0295983 | A1* | 10/2015 | Hu | H04L 67/02 719/329 |
| 2015/0347501 | A1* | 12/2015 | Goshen | G06F 17/30392 707/722 |
| 2015/0373424 | A1* | 12/2015 | Persson | H04H 60/73 725/62 |
| 2017/0287317 | A1* | 10/2017 | Tavares | G08B 27/001 |

* cited by examiner

*Primary Examiner* — Christopher J Raab
(74) *Attorney, Agent, or Firm* — Brian J. Colandreo; Mark H. Whittenberger; Holland & Knight LLP

(57) ABSTRACT

A method, computer program product, and computing system for receiving a language-generic message identifier from a storage system that is for a client electronic device. A preferred language is identified for the client electronic device. A database is searched using the language-generic message identifier and the preferred language to identify a language-specific notification.

15 Claims, 3 Drawing Sheets

NOTIFICATION SYSTEM AND METHOD

TECHNICAL FIELD

This disclosure relates to notification systems and, more particularly, to notification systems for use with computer-based storage systems.

BACKGROUND

Storing and safeguarding electronic content is of paramount importance in modern business. Accordingly, various methodologies may be employed to protect and distribute such electronic content. For example, complex high-availability storage systems may include dozens of components/systems/subsystems, wherein the same complex high-availability storage system may be accessed by users in different countries that communicate in different languages. Accordingly, these complex high-availability storage systems may need to be configured to communicate with its users in multiple languages.

SUMMARY OF DISCLOSURE

In one implementation, a computer-implemented method is executed on a computing device and includes receiving a language-generic message identifier from a storage system that is for a client electronic device. A preferred language is identified for the client electronic device. A database is searched using the language-generic message identifier and the preferred language to identify a language-specific notification.

One or more of the following features may be included. The language-specific notification may be provided to the client application. The language-specific notification may be rendered on the client application. The client application may be coupled using a RESTful API. Identifying a preferred language for the client electronic device may include receiving a language identifier from the client electronic device. The preferred language may be a conversational language. Searching a database using the language-generic message identifier and the preferred language to identify a language-specific notification may include searching the database using a database join command.

In another implementation, a computer program product resides on a computer readable medium and has a plurality of instructions stored on it. When executed by a processor, the instructions cause the processor to perform operations including receiving a language-generic message identifier from a storage system that is for a client electronic device. A preferred language is identified for the client electronic device. A database is searched using the language-generic message identifier and the preferred language to identify a language-specific notification.

One or more of the following features may be included. The language-specific notification may be provided to the client application. The language-specific notification may be rendered on the client application. The client application may be coupled using a RESTful API. Identifying a preferred language for the client electronic device may include receiving a language identifier from the client electronic device. The preferred language may be a conversational language. Searching a database using the language-generic message identifier and the preferred language to identify a language-specific notification may include searching the database using a database join command.

In another implementation, a computing system includes a processor and a memory system configured to perform operations including receiving a language-generic message identifier from a storage system that is for a client electronic device. A preferred language is identified for the client electronic device. A database is searched using the language-generic message identifier and the preferred language to identify a language-specific notification.

One or more of the following features may be included. The language-specific notification may be provided to the client application. The language-specific notification may be rendered on the client application. The client application may be coupled using a RESTful API. Identifying a preferred language for the client electronic device may include receiving a language identifier from the client electronic device. The preferred language may be a conversational language. Searching a database using the language-generic message identifier and the preferred language to identify a language-specific notification may include searching the database using a database join command.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
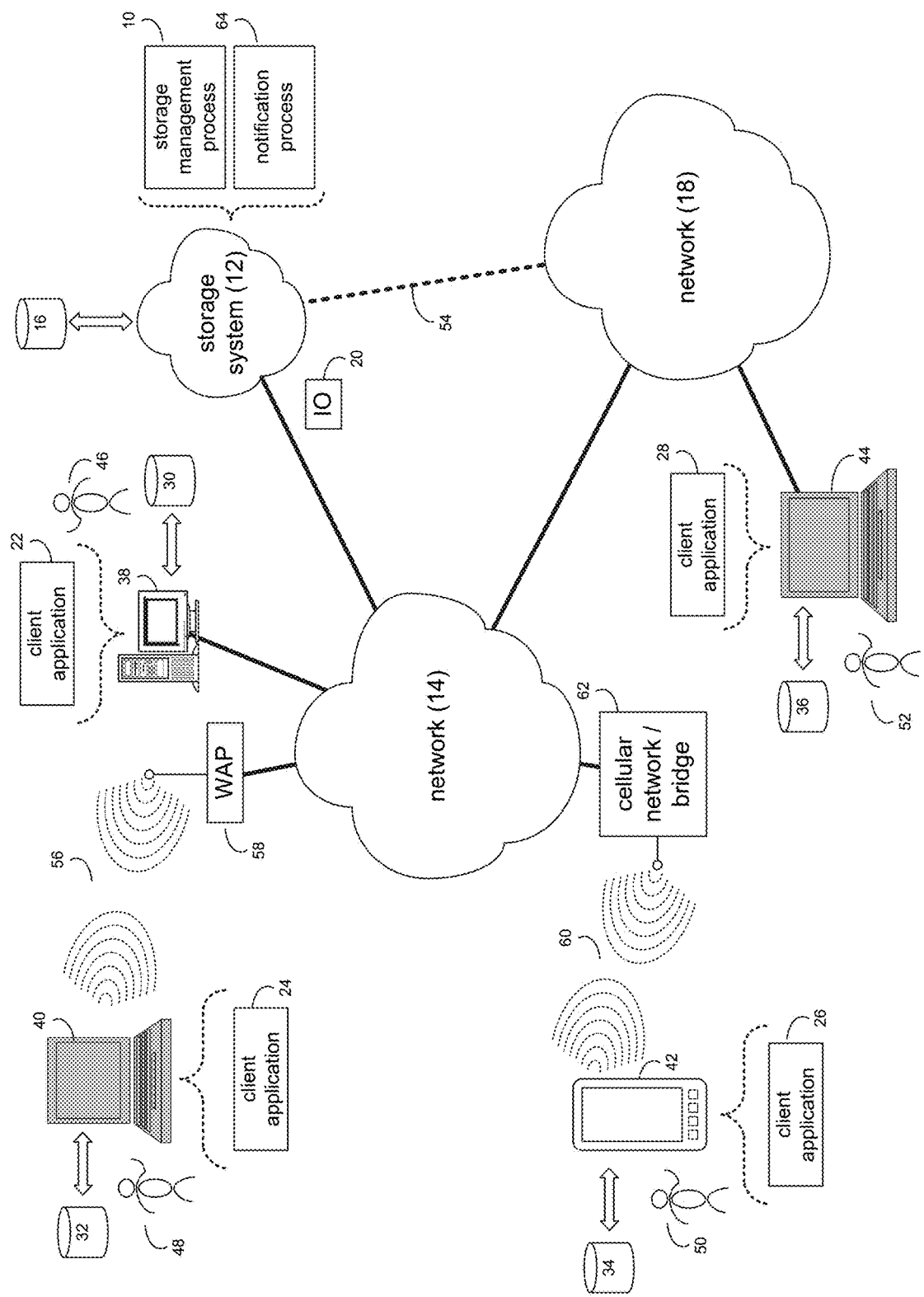
FIG. 1 is a diagrammatic view of a storage system, a notification process and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of backend storage devices. However, this is for illustrative purposes only and is not intended to be a limitation of this disclosure, as other configurations are possible and are considered to be within the scope of this disclosure.

Figure 2:
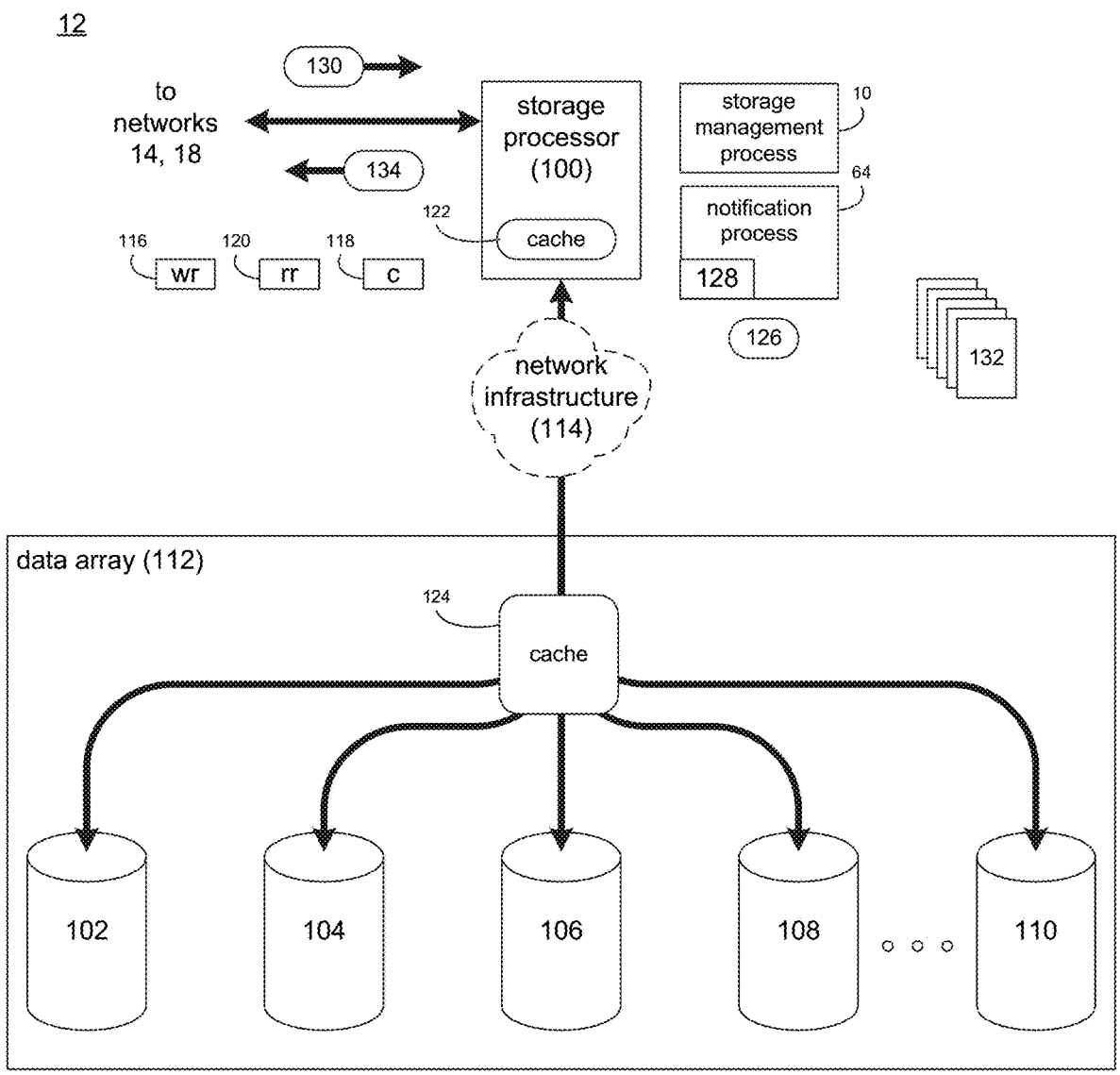
FIG. 2 is a diagrammatic view of the storage system of FIG. 1.

Data Storage System:

Referring also to FIG. 2, there is shown a general and illustrative implementation of storage system 12. In this general and illustrative implementation, data storage system 12 may include storage processor 100 and a plurality of storage targets (e.g. storage targets 102, 104, 106, 108, 110).

Storage targets 102, 104, 106, 108, 110 may be configured to provide various levels of performance and/or high availability. For example, one or more of storage targets 102, 104, 106, 108, 110 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108, 110 may be configured as a RAID 1 array, in which data is mirrored between storage targets. By mirroring data between storage targets, a level of high availability is achieved as multiple copies of the data are stored within storage system 12.

While storage targets 102, 104, 106, 108, 110 are discussed above as being configured in a RAID 0 or RAID 1 array, this is for illustrative purposes only and is not intended to be a limitation of this disclosure, as other configurations are possible. For example, storage targets 102, 104, 106, 108, 110 may be configured as a RAID 3, RAID 4, RAID 5, RAID 6 or RAID 7 array.

While in this particular example, storage system 12 is shown to include five storage targets (e.g. storage targets 102, 104, 106, 108, 110), this is for illustrative purposes only and is not intended to be a limitation of this disclosure. Specifically, the actual number of storage targets may be increased or decreased depending upon e.g. the level of redundancy/performance/capacity required.

One or more of storage targets 102, 104, 106, 108, 110 may be configured to store coded data, wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage device.

Examples of storage targets 102, 104, 106, 108, 110 may include one or more electro-mechanical hard disk drives and/or solid-state/flash devices, wherein a combination of storage targets 102, 104, 106, 108, 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108, 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108, 110 may be a RAID device and/or computer-based hard disk drives. Further still, one or more of storage targets 102, 104, 106, 108, 110 may be a SAN.

In the event that storage system 12 is configured as a SAN, the various components of storage system 12 (e.g. storage processor 100, storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, 110.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage management process 10 may be executed by one or more processors (not shown) and one or more memory architectures (not shown) included within data array 112.

Notification Process:

Storage system 12 may execute all or a portion of notification process 64, wherein notification process 64 may be configured to provide notifications to one or more of e.g., client electronic devices 38, 40, 42, 44.

Notification process 64 may be implemented as a server-side process or a hybrid server-side/client-side process. For example, notification process 64 may be implemented as a purely server-side process via notification process 64. Alternatively, notification process 64 may be implemented as a hybrid server-side/client-side process via notification process 64 in combination with one or more of client application 22, client application 24, client application 26 and/or client application 28. Accordingly, notification process 64 as used in this disclosure may include any combination of notification process 64, client application 22, client application 24, client application 26 and client application 28.

The instruction sets and subroutines of notification process 64, which may be stored on a storage device (e.g., storage device 16) coupled to storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

During operation of storage system 12, various messages may be generated and provided to client applications 22, 24, 26, 28, wherein these message may provide instructions to the user (e.g., Please Enter Your Password), may provide warnings to the user (e.g., Data is Corrupted) or may provide information to the user (e.g., Backup Operation has Completed). Further and when configured, the users (e.g., users 46, 48, 50, 52) of storage system 12 may be located in different countries that speak different languages. For example, user 46 may be located in the United States, user 48 may be located in China, User 50 may be located in Brazil, and user 52 may be located in Spain. Accordingly and as discussed above, notification process 64 may be configured to provide notifications to one or more of e.g., client electronic devices 38, 40, 42, 44 in a variety of languages (e.g., a conversational language, such as English, Mandarin Chinese, Portuguese and/or Spanish).

Figure 3:
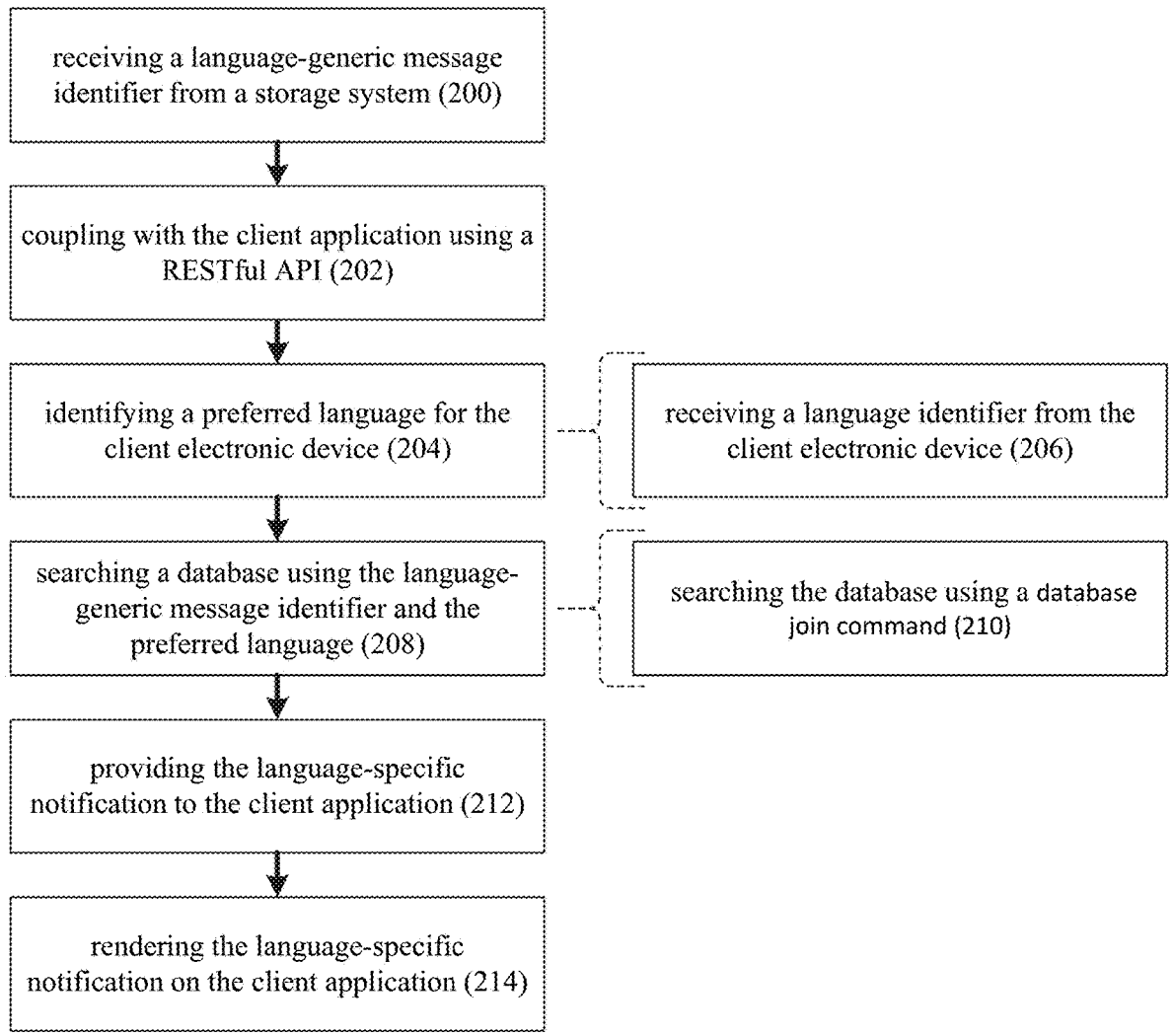
FIG. 3 is a flow chart of the notification process of FIG. 1.

Referring also to FIG. 3, notification process 64 may receive 200 a language-generic message identifier (e.g., generic message identifier 126) from a storage system (e.g., storage system 12) that is for a client electronic device (e.g., one of client electronic devices 38, 40, 42, 44). For example, generic message identifier 126 may have been generated by storage management process 10 in response to the failure of a storage target within data array 112. Further assume that client electronic device 38 (and user 46) are currently utilizing/accessing/connected to storage system 12 (via client application 22) and are currently using data array 112. Accordingly, generic message identifier 126 may be a recommendations that user 46 save their work. Additionally, generic message identifier 126 may not actually include any words and may simply be an identifier (e.g., Message 17).

In this example, notification process 64 may couple 202 client application 22 to storage system 12/notification process 64 using RESTful API 128. As is known in the art, an application program interface (API) is a set of routines, protocols, and tools that allow external computers/applications to access and interact with a program (e.g., notification process 54). Further and as is known in the art, representational state transfer (REST) is an architectural style that includes a coordinated set of architectural constraints applied to components, connectors, and data elements within a computing system. Accordingly and when an API conforms to the constraints of REST, those conforming APIs are said to be RESTful APIs.

Notification process 64 may identify 204 a preferred language for the client electronic device (e.g., client electronic device 28). Typically, when identifying 204 a preferred language for client electronic device 28, notification process 64 may receive 206 language identifier 130 from (in this example) client electronic device 38 and client application 22, wherein language identifier 130 may define English as the preferred language.

Prior to sending generic message identifier 126 to client electronic device 38/client application 22, generic message identifier 126 will need to be converted to an English language-specific notification. Accordingly, notification process 64 may search 208 a database (e.g., database 132) using language-generic message identifier 126 and the preferred language (i.e., English) to identify a language-specific notification (e.g., language specific notification 134). For example and when searching 208 database 132 using language-generic message identifier 126 and the preferred language (i.e., English), notification process 64 may search 210 database 132 using a database join command. As is known in the art, a database join command typically combines columns from one or more tables within a relational database, wherein the tables may be joined using values that are common to each.

For example, a first table within database 132 may define the message identifier (e.g., Message 17) and a generic message (e.g., drive failure) and another table within database 132 may define the message identifier (e.g., Message 17), a language (e.g., English, Mandarin Chinese, Portuguese or Spanish) and "Message 17" in these various languages. So by executing a search using a database join command with the search variables being "Message 17" and "English", the appropriate English-language notification (e.g., language specific notification 134) may be identified within database 132 Assume for this example that language specific notification 134 is an English message that say "You have experienced a drive failure. Please save your work to an external device".

Once identified, notification process 64 may provide 212 the language-specific notification (e.g., language specific notification 134) to client electronic device 28/client application 22 (and, therefore, user 46) and may render 214 language specific notification 134 on electronic device 28/client application 22. Accordingly and in this example, "You have experienced a drive failure. Please save your work to an external device" may be rendered 214 on a display screen associated with client electronic device 38.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   receiving a language-generic message identifier from a storage system that is for a client electronic device, wherein the storage system is communicatively coupled to the client electronic device and is configured to transmit data between a client application executed on the client electronic device and a plurality of drives associated with the storage system, wherein the language-generic message identifier from the storage system identifies a language-generic message associated with the storage system from a plurality of language-generic messages associated with the storage system;
   identifying a preferred language for the client electronic device;
   searching a database using the language-generic message identifier and the preferred language to identify a language-specific notification from a plurality of language-specific notifications associated with the language-generic message;
   providing the language-specific notification to the client application, wherein the language-specific notification includes at least one of instructions, warnings, and information for a user of the client application; and
   rendering the language-specific notification on the client application, wherein rendering is executed on a display screen associated with the client electronic device, and wherein the language-specific notification is configured to provide at least one notification to the client electronic device in a plurality of languages, wherein the at least one notification to the client electronic device includes a notification of a drive failure of at least one drive of the plurality of drives associated with the storage system.

2. The computer-implemented method of claim 1 further comprising:
   coupling with the client application using a RESTful API.

3. The computer-implemented method of claim 1 wherein identifying a preferred language for the client electronic device includes:
   receiving a language identifier from the client electronic device.

4. The computer-implemented method of claim 3 wherein the preferred language is a conversational language.

5. The computer-implemented method of claim 1 wherein searching a database using the language-generic message identifier and the preferred language to identify a language-specific notification includes:
   searching the database using a database join command.

6. A computer program product residing on a non-transitory computer readable medium having a plurality of instructions stored thereon which, when executed by a processor, cause the processor to perform operations comprising:
   receiving a language-generic message identifier from a storage system that is for a client electronic device, wherein the storage system is communicatively coupled to the client electronic device and is configured to transmit data between a client application executed on the client electronic device and a plurality of drives associated with the storage system, wherein the language-generic message identifier from the storage system identifies a language-generic message associated with the storage system from a plurality of language-generic messages associated with the storage system;
   identifying a preferred language for the client electronic device;
   searching a database using the language-generic message identifier and the preferred language to identify a language-specific notification from a plurality of language-specific notifications associated with the language-generic message;
   providing the language-specific notification to a client application, wherein the language-specific notification includes at least one of instructions, warnings, and information for a user of the client application; and rendering the language-specific notification on a client application, wherein rendering is executed on a display screen associated with the client electronic device, and wherein the language-specific notification is configured to provide at least one notification to the client electronic device in a plurality of languages, wherein the at least one notification to the client electronic device includes a notification of a drive failure of at least one drive of the plurality of drives associated with the storage system.

7. The computer program product of claim 6 further comprising:

coupling with the client application using a RESTful API.

8. The computer program product of claim 6 wherein identifying a preferred language for the client electronic device includes:

receiving a language identifier from the client electronic device.

9. The computer program product of claim 8 wherein the preferred language is a conversational language.

10. The computer program product of claim 6 wherein searching a database using the language-generic message identifier and the preferred language to identify a language-specific notification includes:

searching the database using a database join command.

11. A computing system including a processor and memory configured to perform operations comprising:

receiving a language-generic message identifier from a storage system that is for a client electronic device, wherein the storage system is communicatively coupled to the client electronic device and is configured to transmit data between a client application executed on the client electronic device and a plurality of drives associated with the storage system, wherein the language-generic message identifier from the storage system identifies a language-generic message associated with the storage system from a plurality of language-generic messages associated with the storage system;

identifying a preferred language for the client electronic device;

searching a database using the language-generic message identifier and the preferred language to identify a language-specific notification from a plurality of language-specific notifications associated with the language-generic message;

providing the language-specific notification to a client application, wherein the language-specific notification includes at least one of instructions, warnings, and information for a user of the client application; and rendering the language-specific notification on a client application, wherein rendering is executed on a display screen associated with the client electronic device, and wherein the language-specific notification is configured to provide at least one notification to the client electronic device in a plurality of languages, wherein the at least one notification to the client electronic device includes a notification of a drive failure of at least one drive of the plurality of drives associated with the storage system.

12. The computing system of claim 11 further configured to perform operations comprising:

coupling with the client application using a RESTful API.

13. The computing system of claim 11 wherein identifying a preferred language for the client electronic device includes:

receiving a language identifier from the client electronic device.

14. The computing system of claim 13 wherein the preferred language is a conversational language.

15. The computing system of claim 11 wherein searching a database using the language-generic message identifier and the preferred language to identify a language-specific notification includes:

searching the database using a database join command.

* * * * *